United States Patent
Ibuka et al.

(10) Patent No.: US 7,055,380 B2
(45) Date of Patent: Jun. 6, 2006

(54) TRANSMITTER FOR TIRE CONDITION MONITORING APPARATUS

(75) Inventors: Takashi Ibuka, Gifu (JP); Michiya Katou, Ichinomiya (JP)

(73) Assignee: Pacific Industrial Co., Ltd., Ogaki (JP)

( * ) Notice: Subject to any disclaimer, the term of this patent is extended or adjusted under 35 U.S.C. 154(b) by 83 days.

(21) Appl. No.: 10/802,252

(22) Filed: Mar. 17, 2004

(65) Prior Publication Data

US 2005/0088294 A1    Apr. 28, 2005

(30) Foreign Application Priority Data

Oct. 10, 2003    (JP)    ............................. 2003-352373

(51) Int. Cl.
*G01M 17/02* (2006.01)
(52) U.S. Cl. ........................... 73/146; 455/117; 331/17
(58) Field of Classification Search .................. 73/146, 73/146.5; 455/116; 331/107; 375/296
See application file for complete search history.

(56) References Cited

U.S. PATENT DOCUMENTS

| | | | |
|---|---|---|---|
| 6,876,265 B1 * | 4/2005 | Nantz et al. | ............ 331/107 R |
| 2002/0163977 A1 * | 11/2002 | Kobayakawa | ............... 375/296 |
| 2003/0164741 A1 | 9/2003 | Nantz et al. | ................ 331/107 |
| 2004/0180636 A1 * | 9/2004 | Li et al. | ..................... 455/116 |

FOREIGN PATENT DOCUMENTS

| | | |
|---|---|---|
| EP | 1 116 608 A1 | 7/2001 |
| JP | 09-58230 | 3/1997 |

* cited by examiner

*Primary Examiner*—Edward Lefkowitz
*Assistant Examiner*—Andre Allen
(74) *Attorney, Agent, or Firm*—Fish & Richardson P.C.

(57) ABSTRACT

A transmitter is located in a tire of a vehicle and transmits data indicating a tire condition using a carrier wave. The transmitter has an oscillator circuit and a transmission controller. The oscillator circuit generates the carrier wave. The transmission controller compensates a deviation of the amplitude of the carrier wave generated by the oscillator circuit relative to a predetermined reference value such that the amplitude of the carrier becomes equal to the reference value. This is capable of maintaining a constant amplitude of a carrier wave.

8 Claims, 3 Drawing Sheets

TRANSMITTER FOR TIRE CONDITION MONITORING APPARATUS

BACKGROUND OF THE INVENTION

The present invention relates to a transmitter of a tire condition monitoring apparatus. More particularly, the present invention pertains to a transmitter for a wireless tire condition monitoring apparatus that permits a driver in a vehicle passenger compartment to check conditions of tires, such as the air pressure.

Wireless tire condition monitoring apparatuses that allow a driver in a vehicle passenger compartment to check the conditions of vehicle tires have been proposed. For example, Japanese Laid-Open Patent Publication No. 9-58230 discloses such an apparatus. The apparatus disclosed in the publication includes transmitters and a receiver. Each transmitter is located in the wheel of one of the tires and the receiver is located in the body frame of the vehicle. Each transmitter wirelessly transmits data, which represents the air pressure and the temperature of the tire detected by a pressure sensor and a temperature sensor, using a carrier wave having a predetermined frequency. Accordingly, each transmitter has an oscillator for generating the carrier wave, such as a quartz resonator or a surface acoustic wave (SAW) resonator. The receiver receives data wirelessly transmitted by the transmitters with an antenna and displays the conditions of the tires, for example, on a display located in the dashboard of the vehicle.

As shown in FIG. 6, each transmitter 300 includes an oscillator circuit 310 that has an oscillator 310. The oscillator 310 generates a carrier wave having a predetermined frequency. The carrier wave oscillated by the oscillator 311 is amplified by a transistor 312 and then sent to a transmission controller.

To perform a stable wireless transmission, the amplitude of the carrier wave must be stable. Methods for maintaining a constant amplitude of a carrier wave include a method for maintaining a constant emitter current. The method utilizes a characteristic of a carrier wave that its amplitude is substantially proportionate to an emitter current. Specifically, in the example of FIG. 6, a resistor 313 for regulating a current is used to maintain a constant emitter current, so that the amplitude of the carrier wave is maintained constant.

However, the temperature in the tire in which the transmitter 300 is located significantly varies depending on the condition where the vehicle is used, or the environmental temperature. Therefore, not only the characteristics of the oscillator 311, but also the characteristics of other electronic components such as the transistor 312, the resistor 313, and a battery 314 are varied according to the temperature. As a result, the amplitude of the carrier wave fluctuates. This makes the carrier wave unstable. To cope with this drawback, high precision electronic components may be used for maintaining a constant amplitude of a carrier wave. However, high precision electronic components would increase the price of the transmitters 300.

SUMMARY OF THE INVENTION

Accordingly, it is an objective of the present invention to provide a transmitter for a tire condition monitoring apparatus, which transmitter is inexpensive and capable of maintaining a constant amplitude of a carrier wave.

To attain the above object, the present invention provides a transmitter of a tire condition monitoring apparatus. The transmitter is located in a tire of a vehicle and transmits data indicating a tire condition using a carrier wave. The transmitter has an oscillator circuit and a compensation device. The oscillator circuit generates the carrier wave. The compensation device compensates a deviation of the amplitude of the carrier wave generated by the oscillator circuit relative to a predetermined reference value such that the amplitude of the carrier becomes equal to the reference value.

The present invention also provides a method for adjusting an amplitude of a carrier wave that is used by a transmitter of a tire monitoring apparatus. The method including: detecting data representing a tire condition; generating a carrier wave; amplifying the generated carrier wave with an amplifier, wherein the amplitude of the carrier wave changes in accordance with a current applied to the amplifier; adjusting the value of the current applied to the amplifier such that the amplitude of the carrier wave becomes equal to a predetermined reference value; transmitting the data representing the tire condition with the carrier wave adjusted to the reference value.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Transmitters 30 of a tire condition monitoring apparatus 1 according to one embodiment will now be described with reference to the drawings. The apparatus 1 is used in a vehicle such as an automobile.

Figure 1:
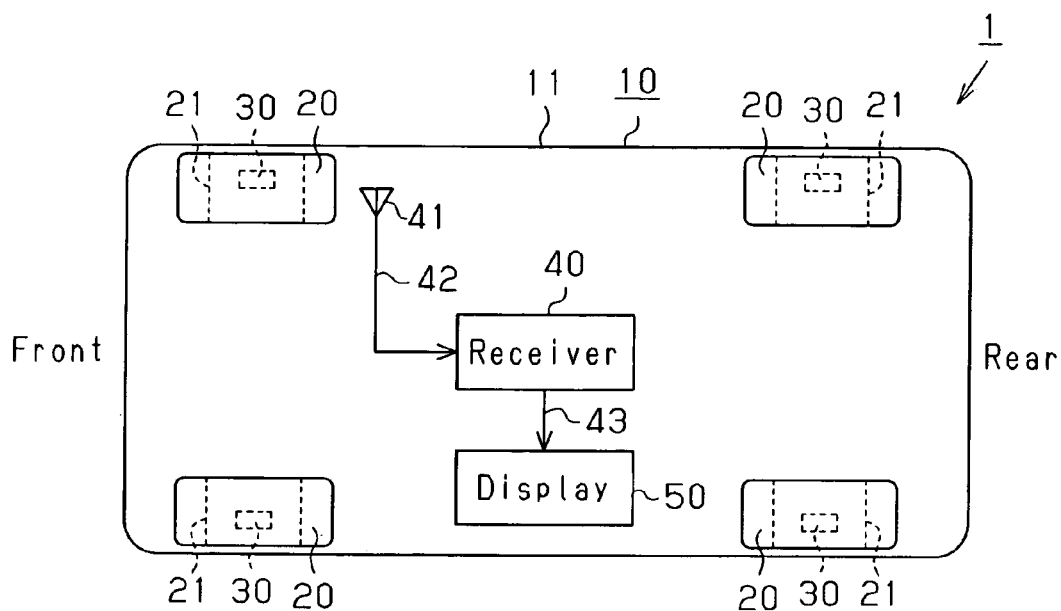
FIG. 1 is a block diagram showing a tire condition monitoring apparatus according to one embodiment of the present invention.

As shown in FIG. 1, the tire condition monitoring apparatus 1 includes the transmitters 30 and a receiver 40. The number of the transmitters 30 is four. Each transmitter 30 is located in one of the tires 20 of a vehicle 10. The receiver 40 is located on a body frame 11 of the vehicle 10.

Each transmitter 30 is located in the corresponding tire 20 and is fixed, for example, to a wheel 21 of the tire 20. Each transmitter 30 measures the condition of the corresponding tire 20, that is, the pressure and the temperature of the tire 20. The transmitter 30 then wirelessly transmits data containing air pressure data and temperature data using a carrier wave of a predetermined frequency.

The receiver 40 is located at a predetermined position on the body frame 11 and is activated by electricity of a battery (not shown) of the vehicle 10. A reception antenna 41 is connected to the receiver 40 with a cable 42. The receiver 40 receives data transmitted by the transmitters 30 through the reception antenna 41.

A display 50 is located in the view of the driver of the vehicle 10, for example, in the passenger compartment. The display 50 is connected to the receiver 40 with a cable 43.

Figure 2:
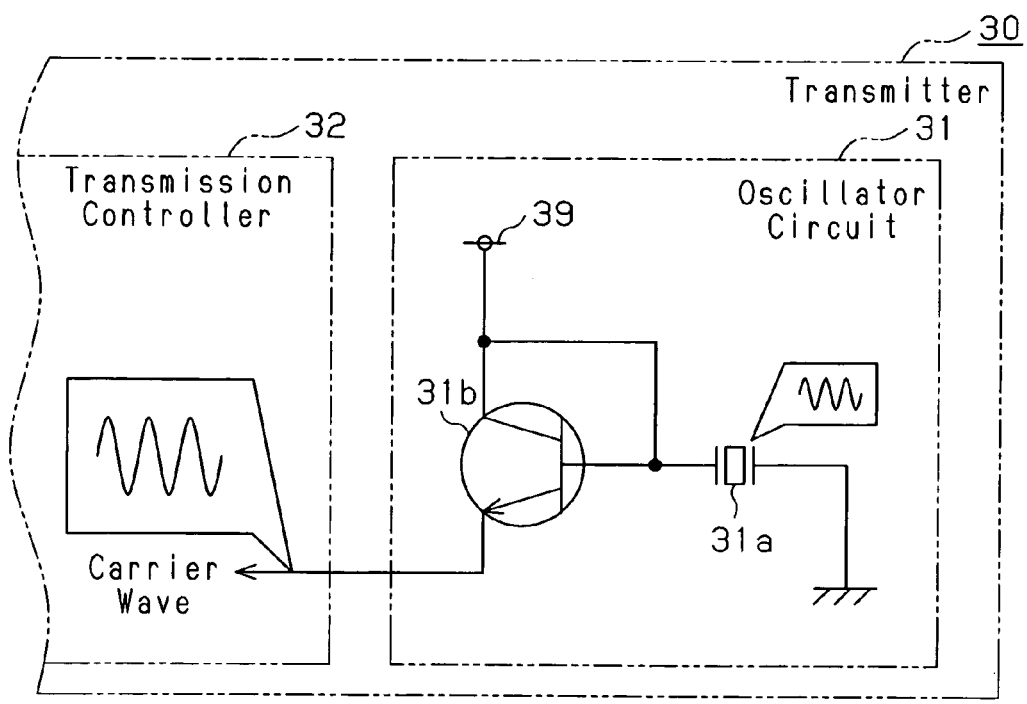
FIG. 2 is a circuit diagram illustrating an oscillator circuit.

As shown in FIG. 2, each transmitter 30 includes an oscillator circuit 31 that has an oscillator circuit 31. The oscillator circuit 31 includes an oscillator that generates a carrier wave having a predetermined frequency, which oscillator is, for example, a SAW resonator. The oscillator circuit 31 includes a transistor 31b. The transistor 31b amplifies the carrier wave generated at the SAW resonator 31a. The oscillator circuit 31 sends the carrier wave, which has been amplified by the transistor 31b, to a transmission controller 32.

Figure 3:
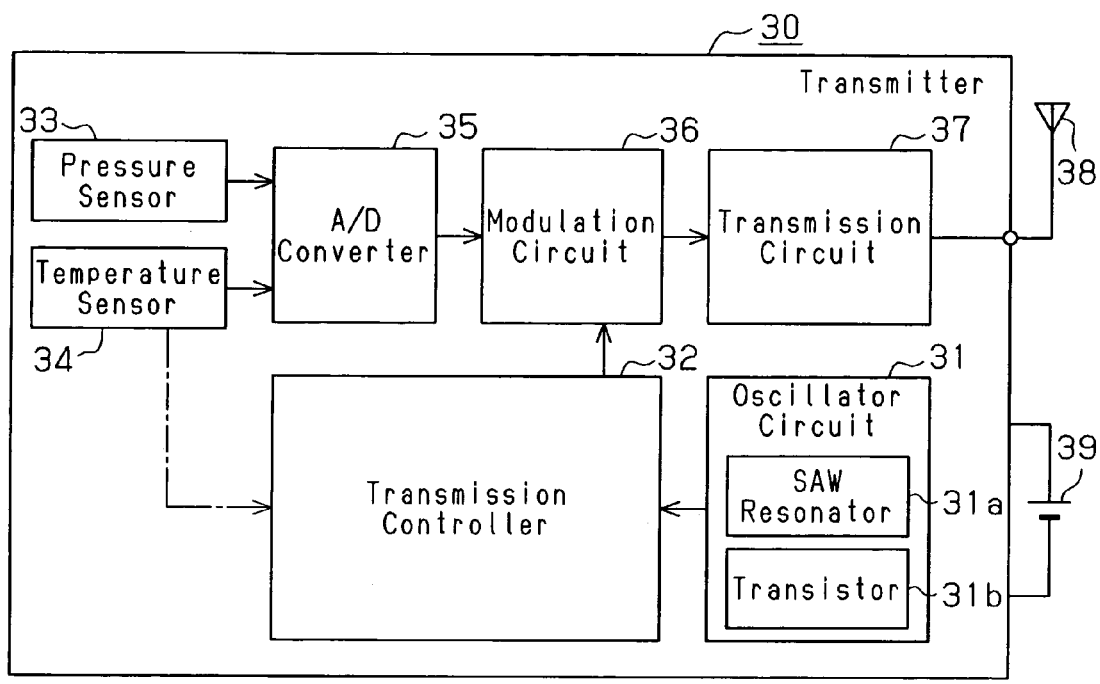
FIG. 3 is a block diagram showing one of the transmitters shown in FIG. 1.

The transmission controller 32 includes a microcomputer and functions as a compensation device. As shown in FIG. 3, the transmission controller 32 includes, for example, a central processing unit (CPU), a read only memory (ROM), and a random access memory (RAM). A unique ID code is registered in an internal memory, for example, the ROM, of the controller 32. The ID code is used to distinguish the associated transmitter 30 from the other three transmitters 30.

A tire pressure sensor 33 measures the air pressure in the interior of the associated tire 20 and provides an A/D converter circuit 35 with pressure data, which is obtained from the measurement. A temperature sensor 34 measures the temperature in the interior of the associated tire 20 and provides the A/D converter circuit 35 with temperature data, which is obtained from the measurement.

The A/D converter circuit 35 converts analog signals from the pressure sensor 33 and the temperature sensor 34 into digital signals. A modulation circuit 36 modulates transmission data using the carrier wave sent from the transmission controller 32, for example, through the frequency modulation. The transmission data includes the air pressure data and the temperature data, which are converted into digital signals, and ID data registered in the internal memory of the transmission controller 32. A transmission circuit 37 wirelessly transmits the modulated transmission date through a transmission antenna 38. The transmitter 30 has a battery 39 and activated by electricity of the battery 39.

The transmission controller 32 of each transmitter 30 controls the pressure sensor 33 and the temperature sensor 34 to perform measurement at predetermined time intervals (for example, every fifteen seconds). Also, the transmission controller 32 controls the transmission circuit 37 to perform periodic transmission every time the pressure sensor 33 and the temperature sensor 34 complete a predetermined number of (for example, forty cycles of) measurements. That is, the transmission controller 32 causes the transmission circuit 37 to perform transmission every ten minutes (15 seconds×40 times). Further, the transmission controller 32 causes the transmission circuit 37 to perform transmission irrelative to the periodic transmission when the air pressure or the temperature in the associated tire 20 is recognized as being abnormal. The timing of transmission of the transmitters 30 is regulated such that each transmitter 30 performs transmission at a timing different from those of the other transmitters 30. Therefore, two or more of the transmitters 30 do not perform transmission simultaneously.

Figure 4:
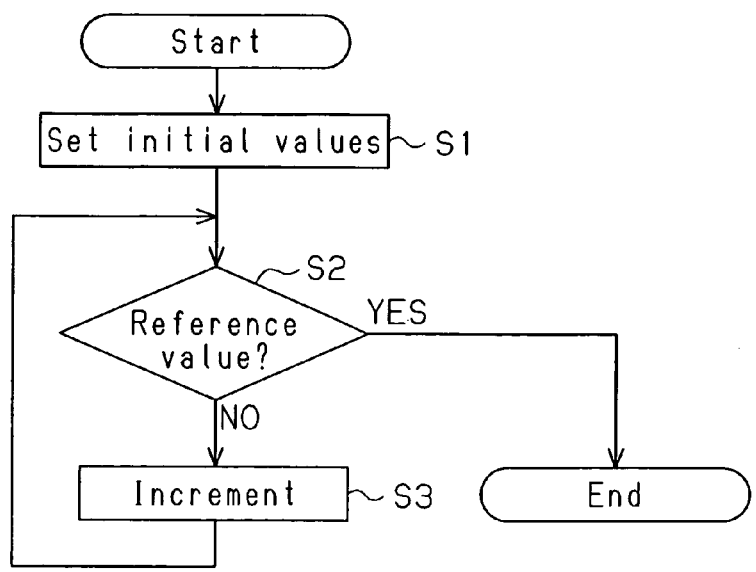
FIG. 4 is a flowchart showing an operation of the transmission controller when the controller controls a transmission circuit to perform transmission.

An operation of the transmission controller 32 when causing the transmission circuit 37 to perform transmission will now be described with reference to the flowchart of FIG. 4. The operation is carried out by the transmission controller 32.

When causing the transmission circuit 37 to perform transmission, the transmission controller 32 sets the emitter current of the transistor 31b to an initial value (S1). Specifically, the transmission controller 32 sets one as the initial value of the emitter current.

The transmission controller 32 determines whether the amplitude of the carrier wave, which is substantially proportionate to the emitter current of the transistor 31b, has reached a reference value (for example, 0.5 Vp-p). If the amplitude of the carrier wave has reached the reference value (positive outcome in S2), the transmission controller 32 terminates the current process. On the other hand, if the amplitude of the carrier wave has not reached the reference value (negative outcome in S2), the transmission controller 32 increments the value of the emitter current (S3). Accordingly, the emitter current is increased. As a result, in proportion to the emitter current, the amplitude of the carrier wave is increased. Then, the transmission controller 32 returns to S2 and determines whether the amplitude of the carrier wave has reached the reference value.

In this description, the expressions that "the amplitude of the carrier wave is constant" and "constant amplitude of the carried wave" do not necessarily mean that the amplitude of the carrier wave is strictly constant. That is, the scope of the expressions includes slight changes in the amplitude of the carrier wave.

In this manner, until the amplitude of the carrier wave reaches the reference value, the transmission controller 32 continuously increments the value of the emitter current of the transistor 31b. The transmission controller 32 utilizes a characteristic of a carrier wave that its amplitude is substantially proportionate to an emitter current. In other words, by adjusting the emitter current of the transistor 31b, the transmission controller 32 maintains the amplitude of the carrier wave to a constant reference value. When the amplitude of the carrier wave reaches the reference value (for example, 0.5 Vp-p), the modulation circuit 36 modulates transmission data, includes the air pressure data and the temperature data and the ID data registered in the internal memory of the transmission controller 32, using the carrier wave.

Figure 5:
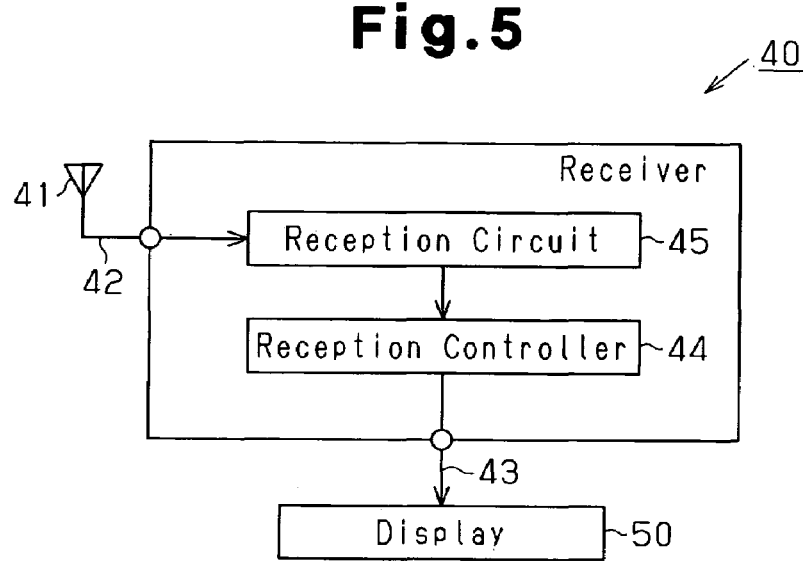
FIG. 5 is a block diagram showing a receiver.
Figure 6:
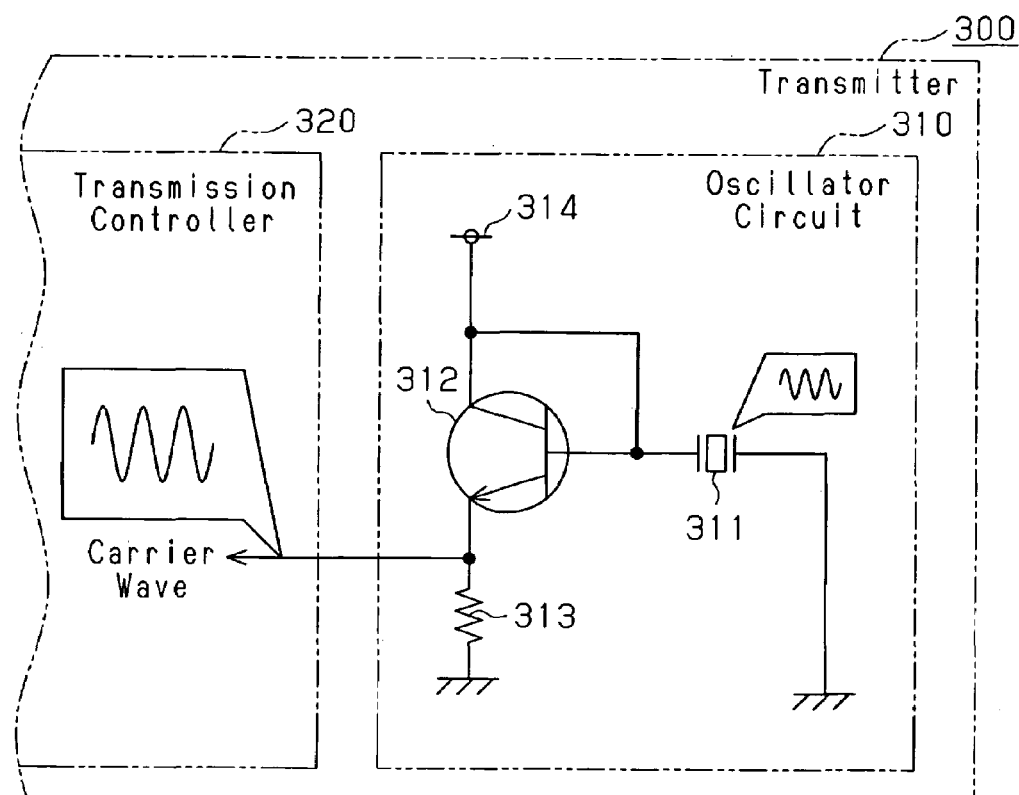
FIG. 6 is a circuit diagram illustrating a prior art oscillator circuit.

As shown in FIG. 5, the receiver 40 includes a reception controller 44 and a reception circuit 45. The reception controller 44 processes data received with the reception antenna 41. The reception controller 44, which is, for example, a microcomputer, includes a CPU, a ROM, and a RAM. The reception circuit 45 receives data transmitted by the transmitters 30 through the reception antenna 41. The reception circuit 45 demodulates and decodes the received data and sends the data to the reception controller 44.

Based on the received data, the reception controller 44 obtains the internal pressure and the temperature of the tire 20 that are associated with the transmitter 30 that is the source of the received data. The reception controller 44 also causes the display 50 to show data regarding the air pressure and the temperature. Particularly, when there is an abnormality in the internal pressure or the temperature of the tire 20, the reception controller 44 displays warning on the display 50. The receiver 40 is activated when a key switch (not shown) of the vehicle 10 is turned on.

This embodiment has the following advantages.

(1) The transmission controller 32 compensates for a deviation of the amplitude of the carrier wave generated by the oscillator circuit 31 from the predetermined reference value, so that the amplitude of the carrier wave becomes equal to the reference value. Specifically, until the amplitude of the carrier wave reaches the reference value, the transmission controller 32 continuously increments the value of the emitter current of the transistor 31b. The transmission controller 32 utilizes a characteristic of a carrier wave that its amplitude is substantially proportionate to an emitter current. In other words, by adjusting the emitter current of the transistor 31b, the transmission controller 32 maintains the amplitude of the carrier wave to a constant value. Therefore, even if the characteristics of electronic components such as the SAW resonator 31a and the transistor 31b, which are included in the oscillator circuit 31, are varied according to changes in the temperature, the amplitude of the carrier wave does not fluctuate. This stabilizes the carrier wave.

(2) The amplitude of the carrier wave is stabilized by incrementing the value of the emitter current. Thus, the amplitude of the carrier wave is maintained to a constant value with a simple configuration. In other words, no high-precision components need to be used in the oscillator circuit 31. Accordingly, an inexpensive transmitter that maintains the amplitude of the carrier wave to a constant value is provided.

(3) The amplitude of the carrier wave is maintained to a constant value by utilizing a characteristic of a carrier wave that its amplitude is substantially proportionate to an emitter current. In other words, instead of connecting a current adjusting resistor to the emitter of the transistor 31b, the value of the emitter current is incremented. Therefore, the dependency of the SAW resonator 31a and the transistor 31b on the temperature does not need to be taken into consideration. Thus, regardless of the conditions under which the vehicle 10 having the transmitters 30 is used, the amplitude of the carrier wave is maintained to a constant value. In other words, the amplitude of the carried wave is not affected by the environmental temperature of the vehicle 10.

(4) Every time causing the transmission circuit 37, the transmission controller 32 sets the emitter current of the transistor 31b to the initial value (one). Then, the transmission controller 32 continuously increments the value of the emitter current of the transistor 31b until the amplitude of the carrier wave reaches the reference value. Therefore, every time the transmission circuit 37 perform transmission, the emitter current is set to the initial value (one). Therefore, even if the temperature in the tire 20 has been greatly increased from the last transmission to the current transmission, the amplitude of the carrier wave is maintained to a constant value. This improves the reliability of the transmitter 30.

It should be apparent to those skilled in the art that the present invention may be embodied in many other specific forms without departing from the spirit or scope of the invention. Particularly, it should be understood that the invention may be embodied in the following forms.

As illustrated by an alternate long and short dash line in FIG. 3, temperature data obtained through measurement of the temperature sensor 34 may be sent to the transmission controller 32. In this case, the transmission controller 32 maintains the amplitude of the carrier wave to a constant value based on the inputted temperature data. Specifically, the transmission controller 32 stores correction values in an internal memory, for example, in the ROM. Each correction value correspond to one of temperature zones, which are, for example, divided by ten-degree steps of temperature. The transmission controller 32 corrects the amplitude of the transfer wave based on the temperature data from the temperature sensor 34. For example, the transmission controller 32 adjusts the emitter current of the transistor 31b based on the temperature date from the temperature sensor 34. Accordingly, the amplitude of the carrier wave is corrected according to the temperature in the tire 20. Thus, the amplitude of the carrier wave is maintained to a constant value.

Based on the inputted temperature data, the temperature characteristics of the electronic components forming the oscillator circuit 31, such as the SAW resonator 31a and the transistor 31b, may be corrected.

When the frequency of the carrier wave from the oscillator circuit 31 is deviated from a predetermined reference value of carrier wave frequency, the frequency of the carrier wave may be corrected based on the inputted temperature data.

The SAW resonator 31a may be replaced by an ceramic oscillator or a quarts oscillator.

The number of the reception antenna 41 is not limited to one. For example, four reception antennas 41 may be provided such that each antenna 41 corresponds to one of the tires 20.

When there is an abnormality in the pressure or the temperature of the tire 20, the abnormality may be indicated by a sound. In addition, a speaker that is mounted on the vehicle 10 in advance may be used as an informing device.

Air pressure data and temperature data transmitted by the transmitter 30 may indicate the values of the air pressure and the temperature or whether the air pressure and the temperature are within permissible ranges.

Other than four-wheeled vehicles, the present invention may be applied to two-wheeled vehicles, such as bicycles and motor cycles, multi-wheeled busses, multi-wheeled trailers and industrial vehicles having the tires 20 (for example, a forklift). When the present invention is applied to a trailer, the receiver 40 and the display 50 are provided in the tractor.

The temperature sensor 34 may be omitted. This reduces the costs of the transmitter 30 of the tire condition monitoring apparatus 1.

Therefore, the present examples and embodiments are to be considered as illustrative and not restrictive and the invention is not to be limited to the details given herein, but may be modified within the scope and equivalence of the appended claims.

The invention claimed is:

1. A transmitter of a tire condition monitoring apparatus, wherein the transmitter is located in a tire of a vehicle and transmits data indicating a tire condition using a carrier wave, the transmitter comprising:
   an oscillator circuit, which generates the carrier wave;
   an amplifier for amplifying the carrier wave, wherein the amplitude of the carrier wave changes in accordance with a current applied to the amplifier; and
   a compensation device, which adjusts the current applied to the amplifier for compensating a deviation of the amplitude of the carrier wave generated by the oscillator circuit relative to a predetermined reference value such that the amplitude of the carrier wave becomes equal to the reference value, wherein, when transmission of the transmitter is started, the compensation device first sets up the value of the current applied to the amplifier until the amplitude of the carrier wave reaches the reference value.

2. The transmitter according the claim 1, wherein the amplifier is a transistor, and wherein the compensation device adjusts an emitter current of the transistor.

3. The transmitter according to claim 1, wherein the compensation device compensates the amplitude of the carrier wave in accordance with a temperature inside the tire.

4. A tire condition monitoring apparatus comprising the transmitter according to claim 1, and a receiver for receiving the data indicating the tire condition transmitted by the transmitter.

5. A transmitter of a tire condition monitoring apparatus, wherein the transmitter is located in a tire of a vehicle and transmits data indicating a tire condition using a carrier wave, the transmitter comprising:
- a tire condition sensor for measuring data representing the condition of the tire;
- an oscillator circuit, which generates the carrier wave, wherein the oscillator circuit includes an amplifier for amplifying the generated carrier wave, and wherein the amplitude of the carrier wave changes in accordance with a current applied to the amplifier;
- a controller for adjusting the current applied to the amplifier such that the amplitude of the carrier wave becomes equal to the reference value, wherein, when transmission of the transmitter is started, the controller first sets up the value of the current applied to the amplifier to a predetermined initial value, and the controller gradually increases the value of the current applied to the amplifier until the amplitude of the carrier wave reaches the reference value; and
- a transmission circuit for sending the data indicating the condition of the tire by the carrier wave adjusted to a reference value.

6. The transmitter according to claim 5, wherein the amplifier is a transistor, and wherein the controller adjusts an emitter current of the transistor.

7. The transmitter according to claim 5, wherein the compensation device compensates the amplitude of the carrier wave in accordance with a temperature inside the tire.

8. A method for adjusting an amplitude of a carrier wave that is used by a transmitter of a tire monitoring apparatus, the method including:
- detecting data representing a tire condition;
- generating a carrier wave;
- amplifying the generated carrier wave with an amplifier, wherein the amplitude of the carrier wave changes in accordance with a current applied to the amplifier;
- adjusting the value of the current applied to the amplifier such that the amplitude of the carrier wave becomes equal to a predetermined reference value, said adjusting the value of the current applied to the amplifier including:
  - setting up, when transmission of the transmitter is started, the value of the current applied to the amplifier to a predetermined initial value; and
  - gradually increasing the value of the current applied to the amplifier from the initial value until the amplitude of the carrier wave reaches the reference value; and
- transmitting the data representing the tire condition with the carrier wave adjusted to the reference value.

* * * * *